United States Patent [19]

Griffith et al.

[11] 4,381,454

[45] Apr. 26, 1983

[54] DOSE EQUIVALENT NEUTRON DOSIMETER

[75] Inventors: Richard V. Griffith, Pleasanton; Dale E. Hankins, Livermore, both of Calif.; Luigi Tomasino, Rome, Italy; Mohamed A. M. Gomaa, Heliopolis, Egypt

[73] Assignee: The United States of America as represented by the United States Department of Energy, Washington, D.C.

[21] Appl. No.: 222,867

[22] Filed: Jan. 7, 1981

[51] Int. Cl.³ .......................... G01T 1/04; G01T 3/00
[52] U.S. Cl. .............................. 250/472.1; 250/473.1; 250/390
[58] Field of Search ............... 250/472, 473, 474, 390, 250/391, 392

[56] References Cited

U.S. PATENT DOCUMENTS

| 3,735,135 | 5/1973 | Bredoux et al. | 250/472 |
| 4,100,414 | 7/1978 | Distenfeld | 250/391 |
| 4,163,154 | 7/1979 | Wheeler et al. | 250/472 |

OTHER PUBLICATIONS

Dutrannois et al., "A Personal Neutron Monitoring System Based on Solid State Nuclear Track Detectors", 10th Int. Conf. Solid State Nuc. Track Det. Jul. 1979 pp. 527-532.
Eisen et al., "Dev. of Neutron Dosimeters for Fast & Epithermal Neutrons", Book of Papers-5th Intern. Congress of Intern. RPA-vol. II, Jerusalem, Israel, Mar. 1980, pp. 157-160.
Hassib et al., "Improvements of the Electrochemical Etching Technique for Fast Neutron Dosimetry", 7th DOE Workshop on Personnel Neutron Dos., Oct. 1978, Tech. Report No. PNL-2807/UC-48, pp. 71-78.
Josefowicz, "183-Dependence of the Efficiency of Neutron Detection in Polycarbonate by Recording Atom Recoil Tracks" Proceedings-Neutron Monitoring for Radiation Protection Purposes, Int. At. En. Agency-Vienna (1973), pp. 163-190.
Sohrabi et al., "A New Polycarbonate Fast Neutron Personnel Dosimeter," *Am. Ind. Hyg. Assoc. J.* (39), Jun. 1978, pp. 438-447.
Piesch et al., "Automatic Spark Counting of Fast Neutron Induced Recoil Particles in Polymers", *Nuc. Inst. & Meth.*, vol. 147, 1977, pp. 57-62.
Balcazar-Garcia et al., "Calibration of CA8015 Cellulose Nitrate for Fast Neutron Dosimetry", *Nuc. Inst. & Meth.*, vol. 161, 1979, pp. 91-95.
Spurny et al., "On the Energetical Dependence of Polymer SSNTD As Fast Neutron Dosimeters", Inter. Conf. on SSNTD, Germany, Sep. 1976, pp. 863-874.
McCall, "Neutron Measurements", *DOE Technical Report No. SLAC-PUB-2662*, Jan. 1981, pp. 1-4.
Benton et al., "Proton Recording Neutron Dosimeter for Personnel Monitoring" Contributions to the 10th Intern. Conf. on SSNTD, France, Jul. 1979, pp. 1-7.
Sohrabi, "A New Dual Response Albedo Neutron Personnel Dosimeter", *Nuclear Inst. & Met.* 165 (1979), pp. 135-138.
Hassib et al., "A Wide Energy Range Neutron Dosimeter Using Electrochemical Track Etch Detectors", Solid State Nuclear Track Detectors 10th International Conference, Jul. 1979, pp. 389-401, Pergamon Press publication.

*Primary Examiner*—Alfred E. Smith
*Assistant Examiner*—Janice A. Howell

[57] ABSTRACT

A neutron dosimeter is disclosed which provides a single measurements indicating the amount of potential biological damage resulting from the neutron exposure of the wearer, for a wide range of neutron energies. The dosimeter includes a detecting sheet of track etch detecting material such as a carbonate plastic, for detecting higher energy neutrons, and a radiator layer containing conversion material such as $^6$Li and $^{10}$B lying adjacent to the detecting sheet for converting moderate energy neutrons to alpha particles that produce tracks in the adjacent detecting sheet. The density of conversion material in the radiator layer is of an amount which is chosen so that the density of tracks produced in the detecting sheet is proportional to the biological damage done by neutrons, regardless of whether the tracks are produced as the result of moderate energy neutrons striking the radiator layer or as the result of higher energy neutrons striking the sheet of track etch material.

8 Claims, 4 Drawing Figures

DOSE EQUIVALENT NEUTRON DOSIMETER

ORIGIN OF THE INVENTION

The Government of the United States of America has rights in this invention pursuant to Department of Energy Contract No. W-7405-ENG-48.

BACKGROUND OF THE INVENTION

Several different types of neutron dosimeters are available for detecting the exposure level of personnel to moderate and high energy neutrons, which are of relatively low cost and compact to enable them to be worn by personnel. One type of dosimeter is the NTA (nuclear track emulsion) film which includes a photographic-type emulsion lying on a plastic base. The film can be developed and the resulting tracks counted to determine the neutron exposure. However, such dosimeters are sensitive primarily to high energy neutrons of more than 0.7 MeV (million electron volts), in that few tracks are produced for moderate energy neutrons of under about 0.7 MeV. Another type of neutron dosimeter is the TLD (thermoluminescence dosimeter)-albedo type which includes a sheet or crystaline chip of neutron-to-alpha particle conversion material such as $^6$Li material. Neutrons striking the conversion material deposit energy in it, and when the sheet is later heated, it emits light which can be recorded to provide an indication of the neutron exposure. However, the material is sensitive primarily to moderate energy neutrons of less than about 1 MeV, such as albedo neutrons generated in the body of a person when he is struck by a high energy neutron.

Another type of neutron dosimeter is the track etch type which utilizes a sheet of dielectric material wherein neutrons produce tracks in the material. One type is the fission track etch dosimeter wherein neutrons striking a foil of fissionable material, produce fission fragments that damage an adjacent sheet of plastic or mica film, with the damage or tracks being visible when the sheet is etched. However, such dosimeters are responsive primarily to high energy neutrons above about 1 MeV. Another type of track etch dosimeter is the recoil track etch dosimeter wherein neutrons strike a sheet of plastic material such as a carbonate to create a track in the sheet, by a process wherein a neutron striking a hydrogen atom causes the emission of an energetic proton that can break the polymer chain of the plastic. Such a dosimeter is also responsive primarily to moderately high-to-high energy neutrons.

In order to determine the exposure level of a person to neutrons, to determine whether the person has received close to the maximum allowable exposure, it is necessary to take into account both moderate and high energy neutrons, and to also take into account the fact that high energy neutrons produce much more biological damage than moderate energy neutrons. One technique for accomplishing this is to use a dosimeter that includes both high and moderate energy detector portions. The dose of moderate energy neutrons is converted into its biological equivalent dose, the dose of high energy neutrons is converted into its biological equivalent dose, and the sum of the biological equivalent doses is taken to determine whether it is close to the maximum allowable equivalent dose. However, the need to examine the record made on two separate devices, and to convert and then to add the resulting measurements, adds to the complexity of the measuring process and increases the chances for errors. A neutron dosimeter that enabled a single measurement to be taken to indicate the biological equivalent dose, as to determine whether the maximum allowable dosage has been reached or not, would simplify the monitoring of neutron exposure of personnel.

OBJECTS AND SUMMARY OF THE INVENTION

One object of the present invention is to provide a neutron dosimeter which facilitates the determination of the biological equivalent dose of the wearer.

Another object is to provide a dosimeter which produces a single readable record, of the potential biological effect of neutron exposure for a wide range of neutron energies.

In accordance with one embodiment of the present invention, a neutron dosimeter is provided which enables a single measurement to be taken that indicates the potential biological effect of neutron radiation of a wide range of energies. The dosimeter includes a detecting sheet of track etch detecting material in which tracks are formed by high energy neutrons, and a radiator layer of neutron-to-alpha particle conversion material lying adjacent to the sheet of track etch detecting material. The density of the conversion material in the radiator layer is of a magnitude chosen so that the number of tracks produced in the adjacent detecting sheet by reason of neutrons striking the dosimeter, is roughly proportional to the potential biological damage that such neutrons would cause. This proportionality of the number of tracks to the potential biological effect of the neutrons causing the tracks, is obtained regardless of whether the neutrons are of moderate energy so that the tracks result from neutron-to-alpha particle conversions in the radiator layer, or are of high energy so that the tracks result from the direct impact of high energy neutrons on the detecting sheet of track etch detecting material.

The conversion material in a dosimeter having a single radiator layer, can consist of $^6$Li and/or $^{10}$B, with this conversion material forming between about 0.01% to 3% by weight of a layer which has a density of at least about 2 milligrams per square centimeter. The sheet of track etch material can be formed of polycarbonate or carbonate plastic.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
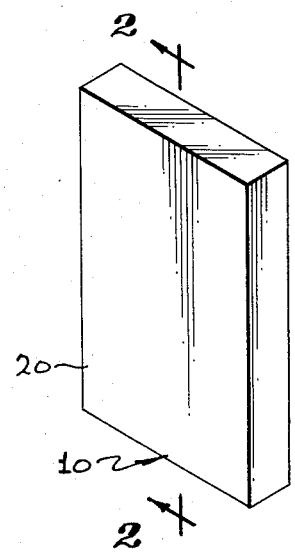
FIG. 1 is a perspective view of a dosimeter constructed in accordance with one embodiment of the present invention.
Figure 2:
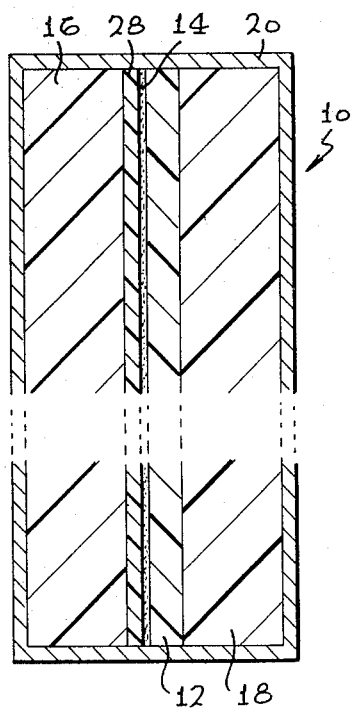
FIG. 2 is a view taken on the line 2—2 of FIG. 1.

FIGS. 1 and 2 illustrate a neutron dosimeter 10 constructed in accordance with the present invention, which is designed to enable a single reading to be taken which indicates the potential biological effect of neutron exposure of a person wearing the dosimeter. The dosimeter includes a sheet 12 of track etch detecting material, in which tracks are formed, and a radiation layer 14 lying adjacent to the detecting sheet 12. A pair of polyethylene spacer sheets 16, 18 lie on opposite sides of the detector sheet and radiator layer 12, 14, and a casing 20 of cadmium surrounds the assembly. The dosimeter 10 can include a pin (not shown) for wearing it like a badge on the person whose neutron radiation exposure is to be monitored.

The detecting sheet 12 can be formed of a polycarbonate or carbonate plastic such as CR-39 manufactured by the Pittsburgh Plate Glass Company. Moderately high to high energy neutrons, of energies above about 0.1 MeV (million electron volts) produce tracks in the detecting sheet 12. Such tracks are visible when the sheet is examined under a microscope, and their visibility is greatly enhanced by etching the sheet by processes that are well known in the art. The radiator layer 14 includes a neutron-to-alpha particle conversion material which is either $^6$Li or $^{10}$B, or a combination of both of them, and also includes an inert material which serves to dilute the conversion material and mechanically hold it in place. The conversion material in the layer 14 produces energetic alpha particles when struck by neutrons of low to moderate energy such as neutrons of up to about 0.1 MeV. The resulting energetic alpha particles strike the detecting sheet 12 and produce tracks in the sheet which are similar to the tracks produced therein directly by high energy neutrons. Thus, the detecting sheet 12 is utilized to form tracks that can be examined under a microscope, with some of the tracks resulting from the direct impact of moderately high to high energy neutrons on the sheet 12, and some of the tracks resulting from the impact of low to moderate energy neutrons on the layer 14 which produces alpha particles that cause the production of tracks in the sheet 12.

The purpose of the dosimeter 10 is to indicate the level of potential biological damage that may have occurred in the wearer due to the wearer's exposure to neutrons. This exposure is commonly referred to as the dose equivalent. When the level of potential biological damage, or the dose equivalent, has reached a certain preset limit, the wearer may be prohibited from working in an environment where he may be exposed to additional neutron flux or other radiation. It is, of course, important that the measurements be closely related to the potential biological effects of the neutron exposure, to avoid excessive exposure of some individuals and to avoid unnecessary prohibition of workers from certain work areas when they are not in danger of overexposure to neutron radiation.

Figure 3:
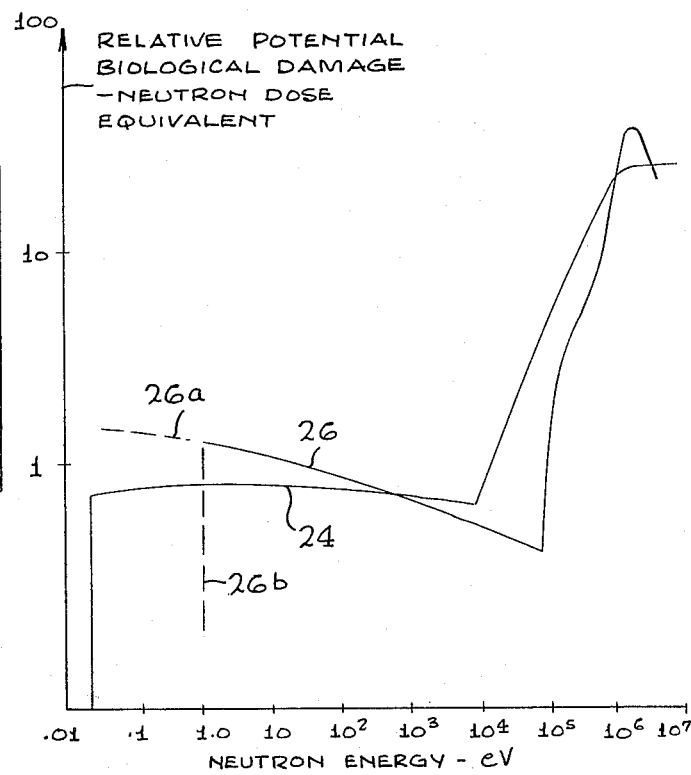
FIG. 3 is a graph showing the relationship between neutron energy and relative biological effect, as it is believed to exist, and also as it is calculated to occur in a dosimeter constructed in accordance with the present invention.

One factor to be considered in constructing the dosimeter is that the relationship between the energy of a neutron and the biological effect of such neutron is highly dependent upon the energy of the neutron, but the dependence is not a simple one. The graph 24 in FIG. 3 shows an estimate of the relative biological effect of neutrons of different energies. The data represented by graph 24 has been published by the National Council on Radiation Protection and Measurements, and is utilized in the industry as an indication of the potential biological effect of neutrons of different energies. It can be seen that the biological effect is approximately constant over a wide range of energies of up to about $10^4$ eV, and then rises sharply so that it is about 100 times greater at a high energy such as $10^6$ eV (i.e. at 1 MeV). Thus, a measurement of the neutron radiation dose should take into account the great variation in biological effect resulting from variations in neutron energy.

Another important effect to consider is that many neutron detecting devices are responsive primarily only to certain neutron energies, and the response is very different than the biological effect of the neutron fluence (number of neutrons passing through a unit area during the period of measurement) at different neutron energies. The CR-39 track etch detecting sheet 12 is directly responsive primarily to neutrons of an energy above 0.1 MeV, and even for neutrons of such high energies only a very small percentage of the neutrons will generate tracks. For example, perhaps only 0.01% of high energy neutrons above 0.1 MeV will directly form a track in the detecting sheet 12. The conversion material in the radiator layer 14, on the other hand, is not only responsive primarily to slow to moderate energy neutrons, but produces alpha particles and corresponding tracks in the detecting sheet 12 for a relatively high percentage of low to moderate energy neutrons striking the conversion material. That is, for low to moderate energy neutrons striking a layer consisting of 100% of $^6$Li and/or $^{10}$B, perhaps five percent to twenty-five percent of the neutrons will produce alpha particles and corresponding tracks in the detecting sheet.

It would be possible to separately detect higher and lower energy neutrons, by using one dosimeter containing a detecting sheet such as 12 without the radiator layer 14 adjacent to it to detect substantially only higher energy neutrons, and to provide another dosimeter for detecting primarily low-to-moderate energy neutrons which would include a layer with a high percentage of conversion material ($^6$Li and/or $^{10}$B) next to a detecting sheet such as 12. Then, tracks on the two devices could be counted, the dose equivalent (biological effect) of the high energy neutrons could be calculated, the dose equivalent of the low-to-moderate energy neutrons could be calculated, and the two could be added together to determine the total dose equivalent. However, the use of two dosimeters, even where they are different parts of a single badge, plus the need to measure tracks separately in two dosimeters and to make calculations, adds to the time required to make a dose equivalent measurement and increases the chances for errors.

In accordance with the present invention, a radiator layer 14 of neutron-to-alpha particle conversion material is utilized adjacent to a detecting sheet 12. However, the relative sensitivities of the radiator layer 14 and of the detecting sheet 12, are chosen so that the density of tracks formed in the sheet 12 is proportional to the potential biological effect of the neutrons causing the production of the tracks. This proportionality will be obtained regardless of whether the tracks are formed by the direct impact of moderately high to high energy neutrons on the sheet 12, or whether the tracks are formed by the conversion of low to moderate energy neutrons into alpha particles by the radiator layer 14 and the consequent production of tracks in the sheet 12 by such alpha particles.

The amount of conversion material ($^6$Li and/or $^{10}$B) in the radiator layer 14 is preferably between about 0.01% and about 3% for a single layer which has a density of at least about 2 milligrams per square centimeter. When this percentage of conversion material is utilized in the radiator layer 14 that lies adjacent to a sheet of CR-39 carbonate plastic material, the density of tracks arising from low to moderate energy neutrons striking the layer 14 is roughly proportional to the potential biological effect of such neutrons, in the same ratio as the density of tracks arising from the direct impact of moderately high to high energy neutrons on the detecting sheet 12 to the potential biological effect of such moderately high to high energy neutrons. The porportion of conversion material (within the range of about 0.01% to about 3%) that should be used depends to a large extent upon the shielding of the radiator layer 14 from very low energy neutrons which have a minimal biological effect. The cadmium layer 20 is provided to stop almost all very low energy neutrons of less than about 0.02 eV and most low energy neutrons of less than about 1 eV, but passes a much higher percentage (though it may be less than 50%) of moderate energy neutrons of over 1 eV. With such a barrier to low energy neutrons, the percentage of conversion material can be at the higher end of the range, such as between about 0.3% and 3%.

The isotope $^6$Li constitutes about 8% of natural lithium. The isotope $^{10}$B constitutes about 20% of natural boron. Thus, if natural lithium or natural boron is utilized in the radiator layer, it must be diluted with an inert material. $^6$Li is somewhat less effective in converting neutrons to alpha particles than is $^{10}$B, so that the preferred range for $^6$Li is about 0.02% to 3% while the preferred range for $^{10}$B is about 0.01% to 2%. One formulation for the layer 14 is to utilize a mixture containing lithium tetraborate ($Li_2B_4O_7$) utilizing naturally occurring lithium and boron. The lithium tetraborate can be utilized by diluting it, so that lithium tetraborate constitiutes about one-third by weight of a mixture of the lithium tetraborate with a binder such as cellulose nitrate, polyurethane, or other plastic material. In this case, the conversion material ($^6$Li and $^{10}$B) constitutes about 2.3% of the material in the radiator layer).

The activity of the radiator layer 14 in producing tracks on the detecting sheet 12 does not depend to a large extent upon the thickness of the layer 14, so long as the layer 14 has a density of at least about 2 milligrams per square centimeter, which results in a thickness of about 0.01 millimeter when used with typical plastic binder materials of a density of about 1.5 times that of water. This is because the alpha particles created by the impact of a neutron with an atom of the conversion material, will not penetrate far through solid material. Thus, if the radiator layer 14 is much thicker than about 0.01 millimeter, it is the portion of about 0.01 millimeter thickness (and having a density of about 2 milligrams per square centimeter) nearest to the detecting sheet 12 which has the primary influence in forming tracks in the sheet 12. It is possible to utilize a radiator layer 14 having a thickness of less than about 0.01 millimeter, so it has a density of less than about 2 milligrams per square centimeter, in which case the percentage of conversion material in the layer can be correspondingly increased, but it is usually easier to apply or fabricate a layer of at least about 0.01 millimeter thickness since it is often difficult to control a very thin layer. For a radiator layer of less than about 0.01 millimeter thickness, the amount of conversion material should be less than about 60 micrograms per square centimeter, and at least about 0.2 micrograms per square centimeter.

The processes at the atomic level by which tracks are formed in the detecting sheet 12 are different for those resulting from low and high energy neutrons. High energy neutrons (which may be defined herein as those of an energy above about 0.1 MeV) striking the detecting sheet 12, can generate energetic protons, and recoiling nuclei, and these protons and nuclei break the polymer chains of the carbonate material of the CR-39 plastic sheet. Only a small percentage of high energy neutrons striking the sheet 12, such as 0.01% will actually result in the generation of a visible track. Low to moderate energy neutrons (moderate energy neutrons may be herein defined as those of up to about 0.1 MeV) striking conversion material in the radiator layer 14, cause the conversion material to emit an energetic alpha particle, of an energy such as 2 MeV. This energetic alpha particle impacts the detecting sheet 12, and can break a polymer chain of the carbonate material of the sheet. Thus, the detecting sheet detects energetic subatomic, or nuclear, particles, because such particles break polymer chains and therefore leave visible tracks. Etching of the sheet increases the width of the tracks, to enable them to be observed under a magnifying glass or microscope. As discussed above, the cadmium layer 20 prevents very low energy neutrons from reaching the radiator layer 14 and generating tracks. The spacer sheets 16, 18 can be formed of polyethylene, and serve to enhance the low energy resonse of the dosimeter. The radiator layer 14 can be formed by coating one side of spacer 16, or by coating a separate sheet 28.

The neutron exposure level can be determined by opening the dosimeter, removing the detecting sheet 12, etching it, and counting the number of tracks within a predetermined area of the sheet. The density of tracks is roughly proportional to the potential biological effect of the neutron exposure, and therefore provides a dose equivalent indication of the neutron exposure. The technician who counts the tracks can merely record the number of tracks per given area. This track density can be multiplied by a predetermined number to indicate the percentage of allowable radiation exposure, the radiation dose equivalent in rem, or some other number indicating the potential biological effect of the neutron radiation. Another alternative is to merely compare the track density to a number on a chart, to determine whether the wearer has been exposed to more than the permitted limit of exposure. The dosimeter can be reused by installing a fresh detecting sheet 12.

One dosimeter construction, as indicated in FIG. 2, includes a radiator layer 14 consisting of lithium tetraborate in an inert binder, wherein the lithium borate constitutes about 33% by weight of the layer. Both the lithium and boron in the material are unenriched, i.e. are natural. This layer has a density of seven milligrams per square centimeter, a thickness of about 0.04 mm, and coats a 0.004 inch thick sheet 28 of cellulose nitrate. The coated sheet 28 lays adjacent to a sheet 16 of polyethylene of about ⅛ inch thickness. A sheet 12 of CR-39 carbonate plastic material of about 1 millimeter thickness lies against the layer 14, and another spacer layer 18 of polyethylene of about ⅛ inch thickness lies against the opposite face of the sheet 12. The sheets are enclosed within a housing 20 of cadmium of a thickness such as 0.7 mm to provide sufficient structural strength and to stop very slow neutrons which have a minimal biological effect. The calculated response of the dosimeter is as indicated by the graph 26 in FIG. 3. That is, the density of tracks produced in the sheet 12 is dependent upon the energy of neutrons as indicated by the graph 26. The graph 26 is roughly equivalent to the dose equivalent curve 24 which represents the actual (estimated) biological effect of neutrons of different energies. If no cadmium layer were present, the graph could be extended as indicated at 26a. With the 0.7 mm cadmium layer, the graph has the characteristic indicated at 26b wherein neutrons of up to about 1 eV are stopped. The number of neutrons between about 0.02 eV and 1 eV that would strike the conversion layer in the absence of a cadmium layer, would depend on which side of the badge faced the wearer, so the cadmium layer is made thick enough to prevent such an effect. Since such neutrons typically constitute only a few percent of neutrons encountered, their elimination is not of great significance. A much thinner cadmium layer can be utilized to stop only neutrons below about 0.02 eV. Thus, the density of tracks, as determined by counting the number of tracks per unit area on the sheet 12, is roughly directly proportional to the potential biological effect of the neutrons to which the wearer was exposed.

Instead of utilizing a single radiator layer 14 beside the detecting sheet 12, it is possible to utilize two layers against the opposite faces of the sheet 12. In fact, if it were desired to detect substantially only low to moderate energy neutrons, a radiator layer should be positioned adjacent to both faces of the detecting sheet to double the response of the dosimeter. However, in the present invention wherein the response to low-to-moderate energy neutrons must be held to a predetermined relatively low level a single layer 14 is sufficient. If two layers are to be utilized, then the density of conversion material ($^6$Li and/or $^{10}$B) should be one-half as great as for a single layer, or in other words should be no more than about 1.5% by weight of the material in the radiator layer. Where it is desired to not only provide a single indication of the dose equivalent of neutron exposure, but also to provide an indication of the energy level of the neutrons to which the wearer was exposed, is possible to provide a separate area of the dosimeter where there is no radiator layer 14. This can be accomplished by simple coating only one-half of the area of the sheet 28 with the conversion material, and leaving the other half of the detecting sheet 12 devoid of an adjacent radiator layer.

Figure 4:
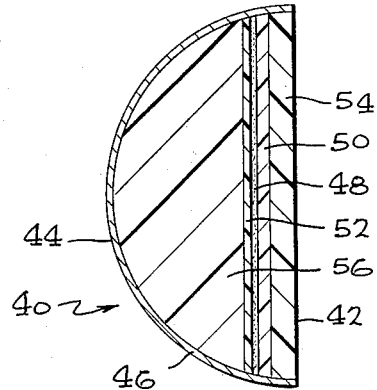
FIG. 4 is a sectional view of a dosimeter constructed in accordance with another embodiment of the invention.

FIG. 4 illustrates a dosimeter 40 constructed in accordance with another embodiment of the invention, wherein one face 42 thereof is not covered by a cadmium sheet. The flat uncovered face 42 is intended to face the body of the wearer to receive albedo neutrons generated in the wearer's body by higher energy neutrons. The other face 44 of the dosimeter is covered by a layer 46 of 0.5 mm cadmium to stop lower energy neutrons. A radiator layer 48 containing a density of conversion material at the lower portion of the ranges mentioned above, lies adjacent to a detecting sheet 50. A cellulose nitrate sheet 52 supports the radiator layer, while sheets 54, 56 of polyethylene lie near opposite faces of the dosimeter.

Thus, the invention provides a neutron dosimeter which enables a single measurement or reading to be taken which provides a dose equivalent indication of neutron exposure, in that the magnitude of the reading is proportional to the potential biological effect of the neutron exposure for a wide range of neutron energies. This is accomplished by providing a radiator layer of neutron-to-alpha particle conversion material adajcent to a sheet of track etched detecting material, wherein the amount of conversion material in the radiator layer is limited to a small percentage which results in the number of tracks created by neutrons in the detecting sheet being proportional to the biological effect of the neutrons over a wide range of neutron energies. The conversion material, which consists of $^6$Li and/or $^{10}$B, preferably constitutes no more than about 3% by weight of the radiator layer where a single layer is utilized, or about 1.5% by weight where two layers are utilized, in those cases where layers of more than about 0.01 millimeter thickness, or two milligrams per square centimeter, are utilized.

Although particular embodiments of the invention have been described and illustrated herein, it is recognized that modifications and variations may readily occur to those skilled in the art and consequently, it is intended that the claims be interpreted to cover such modifications and equivalents.

What is claimed is:
1. A neutron dosimeter comprising:
a detecting sheet of material which includes polymer chains that are easily broken by energetic particles, to detect charged particles, primarily protons but including alpha particles and recoiling nuclei, from the interaction of energetic neutrons with the material; and
a radiator layer which includes a quantity of neutron-to-alpha particle conversion material which generates energetic alpha particles when struck by neutrons, said layer lying adjacent to said detecting sheet so that the resulting alpha particles produce tracks in said detecting sheet;
the density of said conversion material in said radiator layer being in an amount that produces a number of tracks in said sheet for moderate energy neutrons striking the layer, so that the number of tracks produced in the detecting sheet is roughly proportional to the biological effect of the neutrons causing the tracks, both for moderate energy neutrons that strike said radiator layer and cause the generation of energetic alpha particles that produce tracks in said detecting sheet, and for high energy neutrons that strike said detecting sheet to produce tracks, whereby the track density in said detecting sheet provides a dose equivalent indication for a wide range of neutron energies;
said radiator layer having a mass density of at least 2 milligrams per square centimeter, said conversion material being selected from the group consisting of $^6$LI and $^{10}$B, and said radiator layer including between about 0.01% and about 3% by weight of said conversion material.
2. The dosimeter described in claim 1 including:
a casing substantially covering said detecting sheet and radiator layer, and formed to stop most low energy neutrons below about 0.1 eV but to pass a higher percentage of neutrons of more than 0.1 eV than it passes of neutrons below 0.1 eV; and wherein
said conversion material in said radiator layer is present in a density of about 3% by weight.

3. The dosimeter described in claim 1, wherein the material of said detecting sheet is carbonate plastic.

4. A neutron dosimeter comprising:
a detecting sheet of material which includes polymer chains that are easily broken by energetic particles, to detect charged particles, primarily protons but including alpha particles and recoiling nuclei, from the interaction of energetic neutrons with the material; and a radiator layer which includes a quantity of neutron-to-alpha particle conversion material which generates energetic alpha particles when struck by neutrons, said layer lying adjacent to said detecting sheet so that the resulting alpha particles produce tracks in said detecting sheet;

the density of said conversion material in said radiator layer being in an amount that produces a number of tracks in said sheet for moderate energy neutrons striking the layer, so that the number of tracks produced in the detecting sheet is roughly proportional to the biological effect of the neutrons causing the tracks, both for moderate energy neutrons that strike said radiator layer and cause the generation of energetic alpha particles that produce tracks in said detecting sheet, and for high energy neutrons that strike said detecting sheet to produce tracks, whereby the track density in said detecting sheet provides a dose equivalent indication for a wide range of neutron energies;

said radiator layer having a mass density of less than about 2 milligrams per square centimeter, and said conversion material being selected from the group consisting of $^6$Li and $^{10}$B and present in said layer in a density of between about 0.2 and about 60 micrograms per square centimeter.

5. The dosimeter described in claim 4, wherein the material of said detecting sheet is carbonate plastic.

6. A neutron dosimeter comprising:
a detecting sheet of carbonate plastic;
a radiator layer lying adjacent to said detecting sheet; and
a casing which stops most very low energy neutrons of less than about 0.02 eV but passes a much higher percentage of moderate energy neutrons of over one eV;
said radiator layer having an average thickness of at least about 0.01 millimeter, and including a neutron-to-alpha particle conversion material selected from the group consisting of $^6$Li and $^{10}$B, said conversion material present in a density of between about 0.3% and about 3% by weight of said radiator layer.

7. A method for determining the neutron dose-equivalent which is an indication of the biological damage of exposure to neutron flux, comprising:
forming tracks in a sheet of plastic by the direct breaking of polymer bonds by energetic protons and recoiling nuclei produced in the sheet by high energy neutrons passing into said sheet;
generating alpha particles by the passage of moderate energy neutrons into a layer containing neutron-to-alpha particle conversion material, and passing said alpha particles out of said layer and into said sheet of plastic to form tracks therein by the breaking of polymer bonds by said alpha particles;
said step of generating alpha particles including generating a ratio of alpha particles to incident moderate energy neutrons which produce tracks in said sheet, so that the ratio of tracks to the biological damage done by neutrons is the same for high energy neutrons that pass into said sheet as for neutrons that strike said layer and generate alpha particles that produce tracks in said sheet.

8. The method described in claim 7 wherein said plastic sheet is carbonate.

* * * * *